United States Patent Office 3,448,828
Patented June 10, 1969

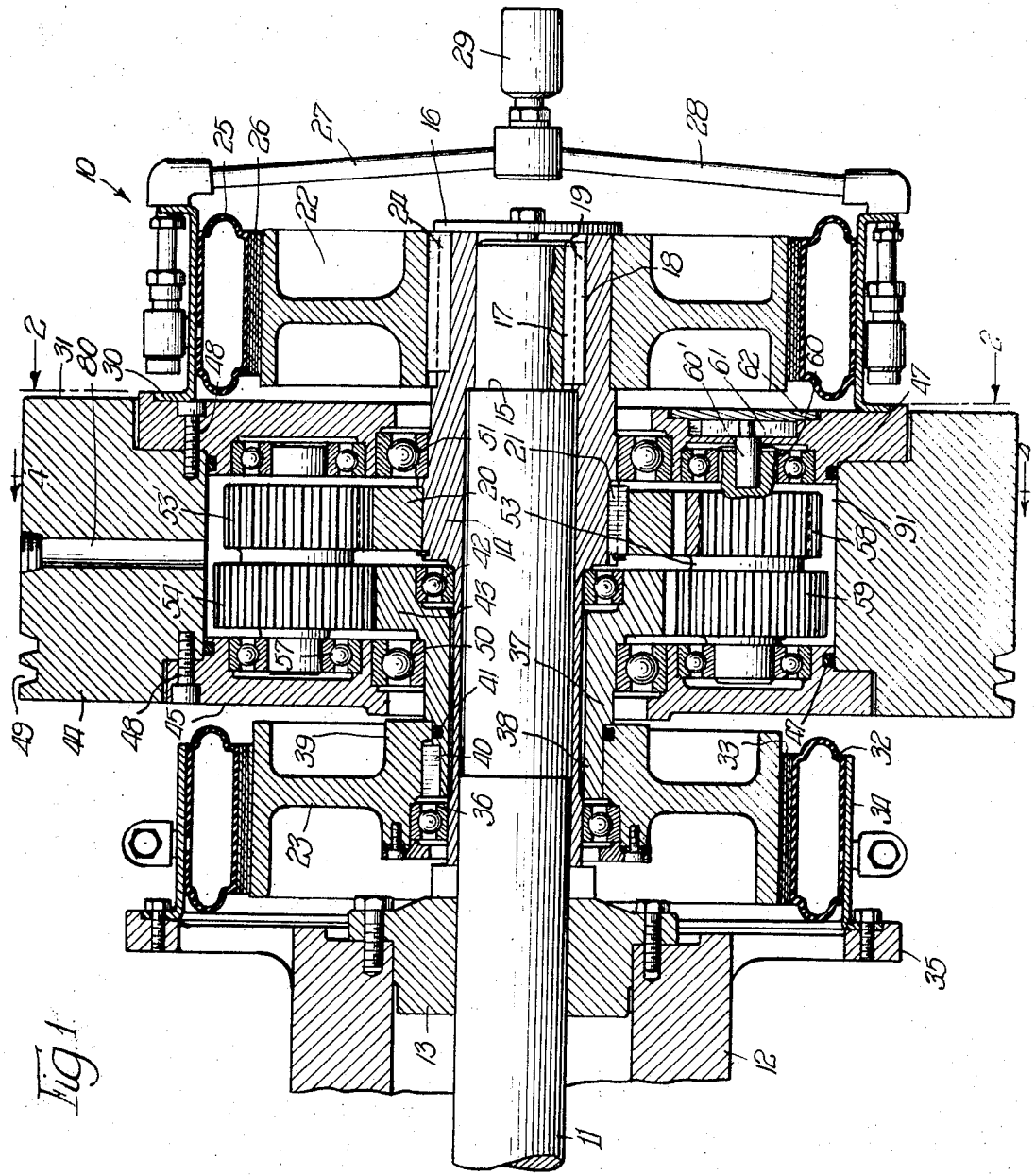

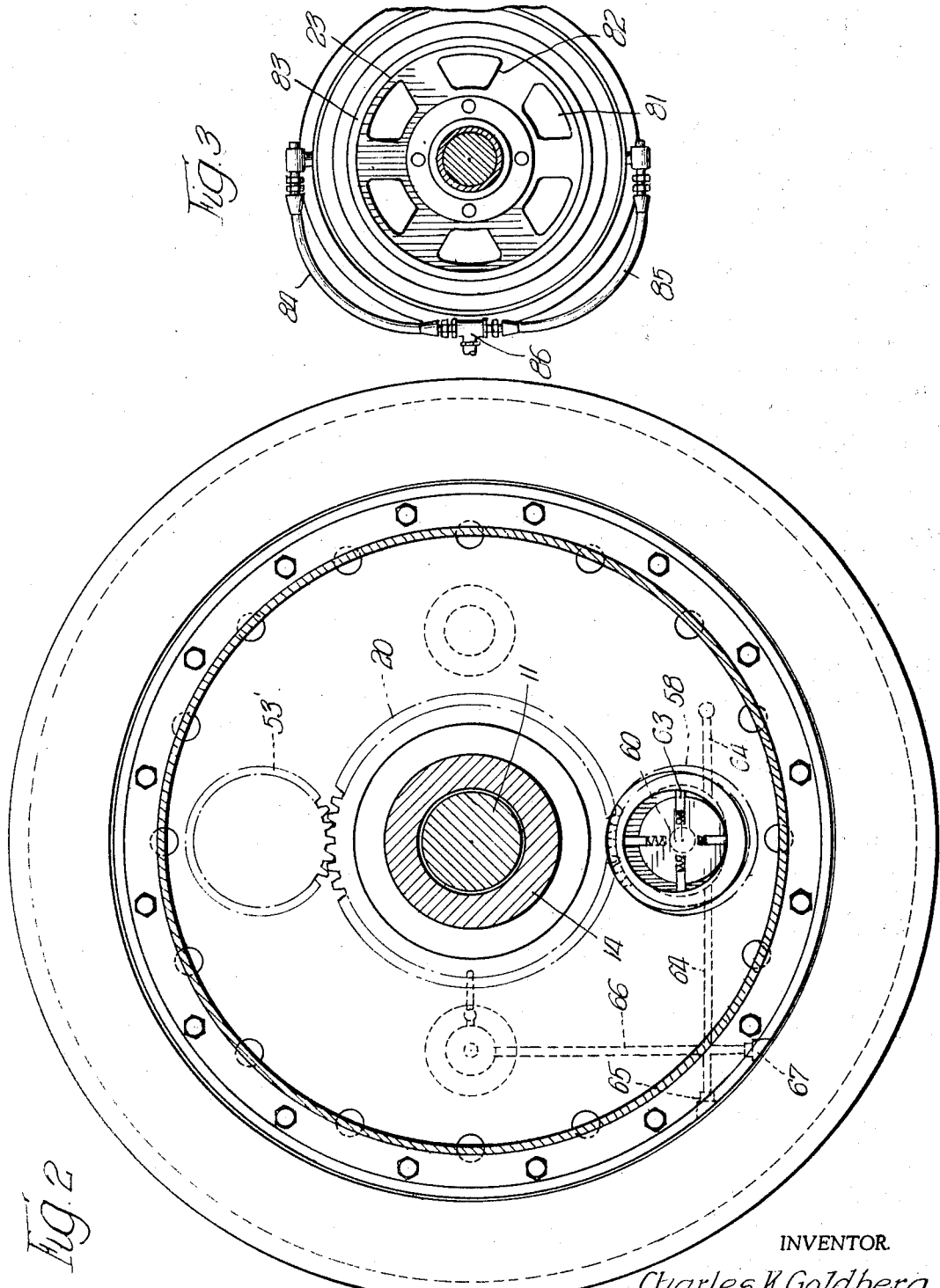

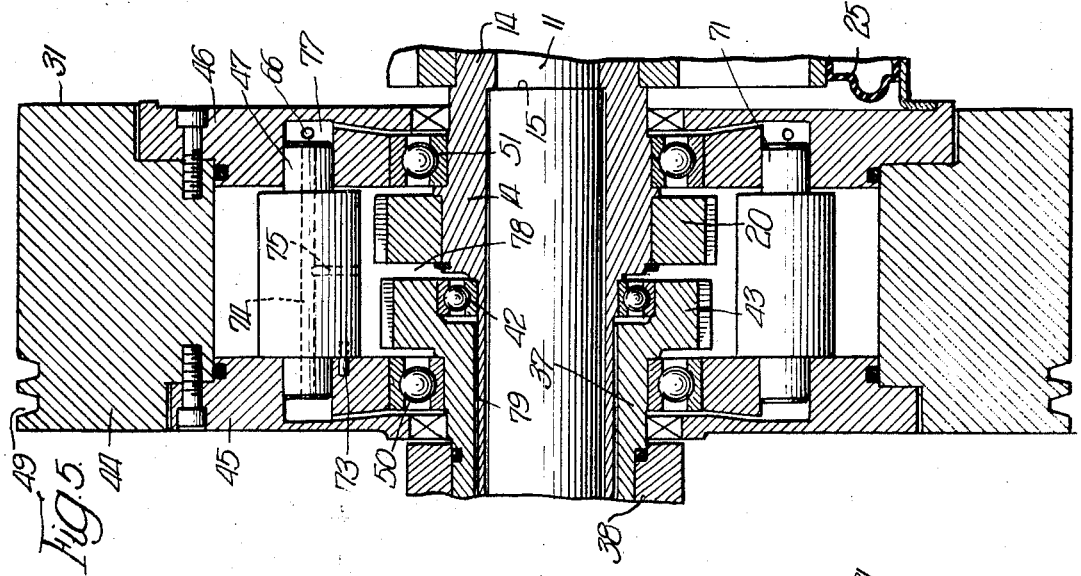
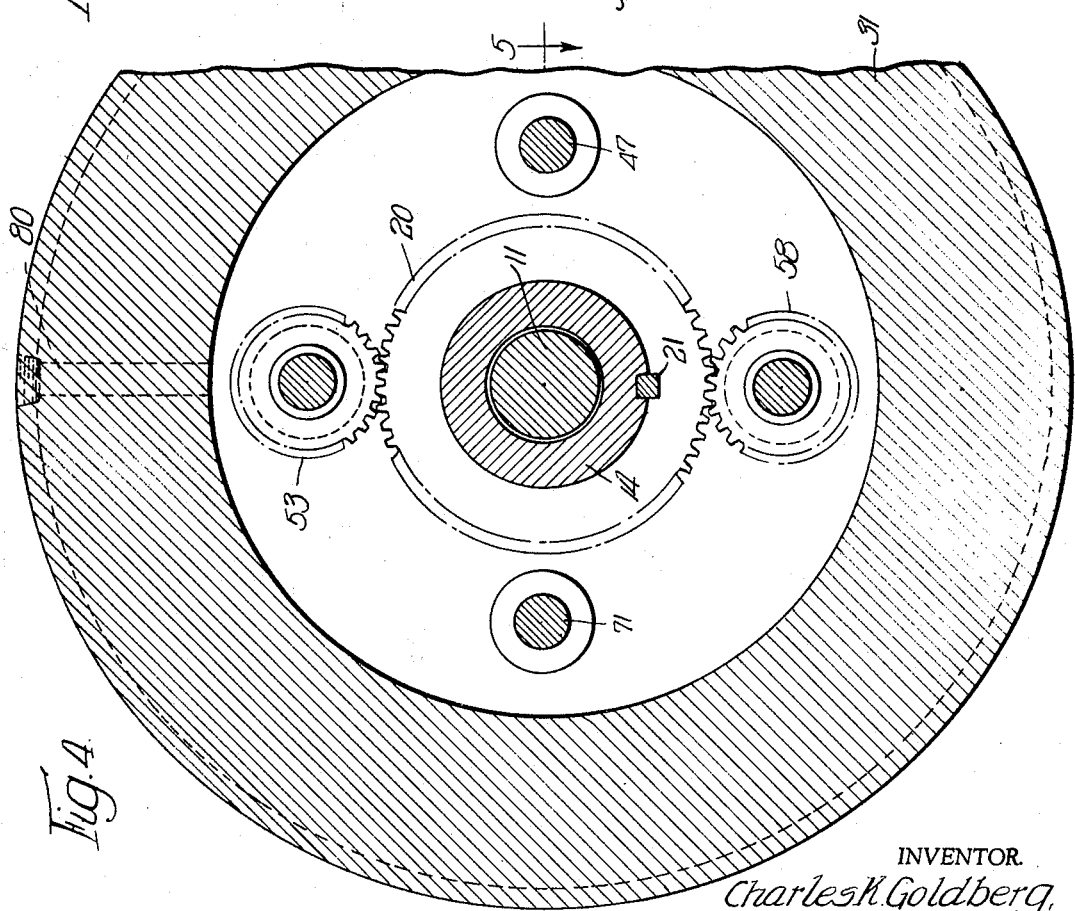

3,448,828
DRIVE SPEED CONTROL
Charles K. Goldberg, Chicago, Ill., assignor to Dreis & Krump Manufacturing Company, Chicago, Ill., a corporation of Illinois
Continuation of application Ser. No. 455,478, May 13, 1965. This application Mar. 27, 1967, Ser. No. 634,400
Int. Cl. F16n 17/00; F01m 1/02
U.S. Cl. 184—6    17 Claims

ABSTRACT OF THE DISCLOSURE

A drive speed control of the planetary transmission type having a lubricating system that does not rely on agitation alone. A sleeve permits keyed mounting of the clutch and brake drums at the factory. An arrangement for air cooling the brake drum is also shown.

---

This application is a continuation of my copending application Ser. No. 455,478, filed May 13, 1965 and now abandoned.

This invention relates to a drive speed control in general and, more specifically, is directed toward an improved form of drive speed control having a wide field of application, including the field of press brakes and the like.

In its broadest sense, the invention relates to a driving pulley, sprocket or the like which is mounted on a shaft to which rotary motion is to be transmitted at the same or a reduced speed with respect to the driven pulley or sprocket. A planetary transmission is provided with suitable gearing to enable a speed selection through the use of a fluid actuatable clutch and brake system, thereby permitting the driven shaft to be operated in direct drive at full pulley speed or through the transmission at a reduced speed, for example, in the ratio of 8:1.

More specifically, the present device contemplates the use of an extended drive sleeve which is coaxially fitted on the shaft to be driven and keyed thereto. The drive sleeve is provided with a suitable drive gear adapted to engage the planetary gear arrangement carried within the pulley. On one side of the pulley, a clutch drum is keyed to the drive so as to rotate within the clutch disc which, as previously mentioned, is fluid actuatable. Opposite the end of the sleeve supporting the clutch drum, a second sleeve is concentrically disposed with respect to the drive sleeve and supported for relative rotation thereto by suitable means. A gear is formed on one end of the second sleeve adjacent the gear on the drive sleeve. A brake drum is also supported for relative rotation by the drive sleeve and is fluid tightly joined to the second sleeve for rotation therewith. A fluid actuatable disc is provided around the peripheral portion of the brake drum to engage the drum in response to the application of fluid pressure thereby to provide braking action.

The pulley or sprocket is supported for relative rotation with respect to each of the first and second sleeves through the interposition of suitable bearings. A pair of planetary gears, integral with their supporting pinion shafts, are provided within the pulley and engage each of the independently rotatable gears carried by the drive and second sleeve. One of the planet pinion shafts is rotatably coupled to a lubricating pump, which is formed in one side of the pulley. The pump is provided with an inlet portion in the internal peripheral region of the pulley with the output of the pump being fed to one of two spacers which directs the fluid pumped toward the central axis of the assembly.

Drive speed controls in and among themselves are not new, however, existing prior art models had presented problems which have plagued those requiring the use of such mechanisms. Among these problems, lubrication has caused considerable difficulty. Some commercial models rely on maintaining the pulley chamber full of gear oil in order that the agitation produced by rotation will lubricate supporting bearings and the intermeshing gears. Obviously, when the fluid level in the gear chamber is somewhat less than full, on rotation, centrifuging action will occur, causing the lubricant to be distributed around the outer periphery, thereby depriving moving parts adjacent the central axis is of adequate lubrication.

The bearings supporting the brake and clutch drums in some prior art models relied on lubrication at assembly to maintain free running of the bearings. This, obviously, is not completely desirable for continuous operation under extreme conditions. Continuous lubrication of all supporting bears is highly desirable if at all possible. Such construction is achieved in the present device by the novel extended sleeve and forced lubrication system.

As previously mentioned, a spacer is provided which serves to distribute the lubricating medium. A second or additional spacer is provided which, together with the first spacer, serves to insure proper alignment as well as eliminating the necessity of timing the planetary gears at final assembly. In the present case, the planetary gears are formed integral with the planetary pinion shaft in the interest of economy, as well as efficiency, in the final assembly of the drive speed control.

The use of an extended sleeve provides several advantages over known types of drive speed control devices. First, both the brake and clutch drums may be mounted thereon at factory assembly so that in the field, only the driving connection need be made through a simple key lock. Distortion of the sleeve is thus avoided with the attendant adverse effect on the running clearances of adjacent bearings.

In some prior art models difficulty has been had with the brake drum becoming overheated which causes a reduction in braking efficiency. Suitable means is provided on the brake drum of the present drive speed control to insure an adequate supply of cooling air to the peripheral region of the drum in order to maintain the drum at the lowest possible temperature, with the resulting advantage of a marked increase in efficiency of the braking action. Additional advantages will become apparent when a perusal is made of the objects to be accomplished and attendant description to follow.

It is, therefore, a principal object of this invention to provide a new and improved drive speed control.

It is a further object of this invention to provide a drive speed control which is provided with a built-in forced lubrication system which will insure proper lubrication of the bearings, gears and other moving parts.

It is a still further object of this invention to provide a drive speed control which has an extended sleeve supporting both the clutch and brake drums, as well as cooperating with a second sleeve to provide a lubricant passage to the external bearing supporting the brake drum.

It is a further object of this invention to provide a spacer means to facilitate accurate assembly, which further serves to distribute the lubricant utilized in this system.

It is a still further object of this invention to provide an improved form of brake and clutching means.

Other objects will become readily apparent when reference is made to the accompanying drawings wherein:

FIGURE 1 is an elevational view in cross section of a drive speed control of the present invention illustrating a fragmentary portion of a shaft to be driven and the associated supporting housing;

FIGURE 2 is a cross-sectional view taken along the line 2—2 of FIGURE 1;

FIGURE 3 is a view taken along the line 3—3 of FIGURE 1 illustrating the brake assembly;

FIGURE 4 is a view taken along the line 4—4 of FIGURE 1; and

FIGURE 5 is a view taken along the line 5—5 of FIGURE 4.

In FIGURE 1, reference character 10 represents a drive speed control device of the present invention connected to a shaft 11 to be driven. A fragmentary portion of a machine housing is shown at 12 having a suitable bearing 13 to support the cantilevered or overhung shaft 11.

A drive sleeve 14 of the drive speed control device 10 is fitted over the shaft 11 and brought into engagement with a shoulder 15, being held thereagainst by suitable means such as a plate 16. The shaft 11 and sleeve 14 are provided with opposed generally radial keyways 17 and 18 which receive a key 19 to couple the shaft 11 and sleeve 14 for rotation. Although a single key has been shown, it is readily apparent that any number of keys may be used, as well as equivalent forms of driving connections so long as the coupling does not tend to misalign or distort the sleeve and shaft.

An output gear 20 is keyed, as at 21, to the sleeve 14 for rotation therewith. At opposite ends of the sleeve 14, a clutch drum 22 and brake drum 23 are provided for purposes to become apparent hereinafter. The clutch drum 22 is connected to the sleeve 14 by means of a key 24 or the equivalent so as to rotate with the sleeve 14 and shaft 11. A clutch disc surrounds the clutch drum 22 with the clutch disc taking the form of an annular inflatable elastomeric bag or tire 25 with a suitable clutch engaging pad 26 on the inner peripheral portion thereof.

Three fluid supply lines (only two shown) 27 and 28 are connected to the elastomeric tire to feed fluid from a suitable source into the tire in order to contract the braking pad 26 into engagement with the drum. A rotary-type coupling 29 is provided to allow relative rotation between the fluid supply and the rotating supply lines 27 and 28. In order to dynamically balance the brake disc mechanism, it is necessary to space the supply lines 120° apart if three are used, or 90° apart if four are used, etc. The clutch engaging mechanism or tire 25 is supported by means of a channel-shaped member 30 which is affixed to the housing 31 so as to rotate therewith. On the opposite end of the sleeve 14, the brake assembly is provided with a concentrically disposed brake disc 33 carried by an inflatable elastomeric bag or tire 32. The brake engaging surface 33 engages the brake drum 23 in response to increased pressure in the tire 32. The bag or tire 32 is supported by an annular member 34 which is generally L-shaped in cross section with the base of the L being fixedly attached to a nonrotatable flange 25 on the machine housing 12.

The brake drum 23 has a hub portion 39 which is supported for rotation relative to the first sleeve 14 by a bearing 36. A second sleeve 37 is coaxially arranged with respect to the first sleeve 14, and has a stepped portion 38 slip fitted within the hub 39 of the brake drum 33. Suitable means, such as a key 40, insures rotation of the brake drum 23 with the second sleeve 37. An O-ring 41 is interposed between the second sleeve 37 and the hub 39 of the brake drum 23 to effect a fluid-tight joint.

The opposite end of the second sleeve 37 has a radially extending flange portion 43 which is suitably machined to provide a geared surface and is supported for rotation relative to the first sleeve 14 by means of a bearing 42. The geared surface of the flange portion is commonly referred to in the art as the "sun" or "held" gear.

The housing 31 is composed of an outer cylindrical shell portion 44 with radially inwardly extending end plates 45 and 46. Each of the end plates is sealed as at 47 and affixed to the cylindrical shell 44 by means of cap screws 48 or the equivalent. The outer periphery of the cylindrical shell 44 may be provided with a series of grooves 49 to cooperate with belts which are driven from any suitable source of power. Obviously, other forms of driving mechanisms may be used such as gearing, sprockets and the like.

The cylindrical shell 44 together with the end plates 45 and 46 defines an annulus which is channel-shaped in cross section, opening radially inward to form an annular housing surrounding the sun gear 43 and output or drive gear 20. Bearings 50 and 51 are interposed between the end plates 45 and 46 to support the housing 31 for rotation relative to the second and first sleeves 37 and 14, respectively.

Supported within the housing are two pairs of pinion gears, indicated generally at 52 and 53. The pinion gear 52 has an output engaging gear 53' and a second pinion gear 54 which engages the sun gear 43. The pinion gears 53' and 54 are machined so as to be integral with the pinion shaft 55 which is rotatably supported in the end plates of the housing by suitable bearings 56 and 57. The pair of pinion gears, indicated generally at 53, is located diametrically opposite the pair of pinion gears indicated at 52. In a manner similar to the pinion gears 53' and 54, gears 58 and 59 engage output gear 20 and sun gear 43, respectively. The gears 58 and 59 are rotatably supported in the end plates of the housing by suitable bearings.

The pinion shaft 60 is connected by means of roll pins or the like to a shaft 60' which extends into a pump chamber machined in the side plate 46 eccentric with respect to the shaft entry opening. A vane carrying rotor 61 is rotatably carried by the shaft 60'. A cover plate 62 completes the assembly. As more clearly seen in FIGURE 2, the pump is of the eccentric rotor variety having spring biased vanes 63 which, on rotation, draw fluid from an inlet 67 and force it through outlet conduits 64 and 66. The outlet path is formed by drilling into the side plate and capping as at 65 and, similarly, drilling as at 66 and capping as at 67 to provide a fluid path to a point on a diameter at right angles to diameter passing through the pinion supports. The inlet portion 67 to the pump opens into an internal peripheral region of the housing, insuring an adequate supply of lubricant even in the event the level is somewhat less than full. On rotation of the housing 31, the lubricant will, under the influence of centrifugal force, be disposed around the inner periphery of the sleeve 44 in the region of the inlet 67. Distribution of the lubricant will be described hereinafter.

In order to insure the proper spacing of the end plates and timing of the planets with respect to each other, a pair of spacers 70 and 71 are provided on a diameter which is angularly oriented 90° from each of the pinion gear shafts. Each of the spacers 70 and 71 has a reduced diameter end on the left-hand portion which is received in a suitable recess in the end plate 45 with a pressed fit. The opposite end of the pins 70 and 71 is of a reduced diameter and fits within the end plate 46 with a close fit to allow removal of the plate for inspection and/or gear replacement.

The spacer 70 has a port 74 drilled through the central axis with a radially extending port 75 communicating with the mid portion of the port. When assembled, the port 75 is directed radially inward and, in order to insure the proper orientation of such, a guide pin 73 is provided. Lubricant is supplied through conduits 64 and 66 to chamber 77 and then through the port 74 to the outlet port 75. The outlet port 75 sprays the lubricant radially inward at all times with a portion of the fluid finding its way into the space 78 between the sun and drive gears. The bearing 42 is thus lubricated, with a portion of the lubricant feeding through the bearing 42 axially in the space or clearance 79 provided between the first and second sleeves 14 and 37. As seen in FIGURE 1, the space 79 is in direct communication with the brake drum supporting bearing 36. It is to be appreciated that continuous lubrication is supplied to all moving parts of the drive speed control, with lubricant flow commencing when the planets begin to rotate due to the supply pump 61 being directly driven by the planet pinion shaft 60. Obviously, if necessary or desirable, a second pump could be provided on the shaft 55 in a manner similar to the one shown on the opposite pinion shaft 53.

The novel lubricating arrangement assures a constant supply of lubrication at all times, notwithstanding the lubricant level in the chamber 91 being somewhat less than full, since, as hereinbefore noted, the pump has its intake positioned adjacent the inner periphery of the shell 44.

Conventional lip seals or the like (indicated by the X's in the boxes) may be provided externally of each of the bearings 51 and 36 to contain the lubricant within the assembly. A lubricant port 80, having a removable plug, is provided to facilitate filling of the chamber 91.

In FIGURE 3, the brake drum 23 is shown in elevation to illustrate the cooling means which supplies cooling fluid to the peripheral portion 83 of the drum 23. A series of spaces 81 are provided in the web of the drum 23, with the remaining portion of the web having angulated portions 82 thereon which serve to force the surrounding medium toward the outer periphery of the drum 83. This assures an adequate amount of cooling air for high efficiency in the breaking operation.

Although the cooling means illustrated is represented as being formed by angulation of the web to form fan-type blades, it is obvious that other forms of construction could be readily utilized to achieve the intended function. For example, sheet metal or plastic scoops could be fastened to the web by clips, rivets or the like to direct the air radially outward. These are only exemplary of the various forms which the cooling means may take.

Conduits 84 and 85 are provided to supply fluid to the inflatable tire 32 via a T connection 86 which is connected to the suitable source of supply (not shown). Upon application of fluid pressure, the tire 32 expands forcing the breaking pad 33 into gripping engagement with the drum 23. Upon venting of the interior chamber of the tire 32, the elastomeric properties of the side wall cause it to collapse slightly moving the braking pad 33 away from the peripheral portion 83 of the drum 23.

The operation of the drive speed control will now be explained. If neither the brake 23 nor clutch 22 is engaged by the associated disc 33 or 26, respectively, the pulley rotates about its central axis with no motion transmitted to the drive shaft 11. The pinions will rotate with the result that lubricant will be supplied to the moving parts. Assuming that tire 32 is inflated bringing the pad 33 into engagement with the drum to prevent rotation, the sun gear is prevented from rotating and rotary motion will be transmitted from the pulley through the planetary arrangement to the output gear 20 thus driving the output shaft 11 at a reduced speed, for example, one revolution for every eight revolutions of the pulley. Obviously, this ratio may be changed by variation of the gear ratios. Assuming that it becomes desirable to rotate the drive shaft 11 at the same rotational speed as the housing 31, the tire 32 is deflated, and tire 25 inflated to form a direct drive through the channel 30, tire 25 and clutch drum 22 to the first sleeve 14 and shaft 11. The use of a rotary fluid coupling 29 assures maintaining adequate fluid pressure to keep the clutch disc 26 in gripping engagement with the outer peripheral portion of the drum 22 so that little or no slippage will occur. Suitable means (not shown) may be provided to assure that the tire 25 and the tire 32 are not inflated simultaneously, for example, through use of a multiple port valve which vents one chamber while inflating the other and vice versa.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. A drive speed control comprising a shaft to be driven, first sleeve means connected to said shaft for driving engagement therewith, second sleeve means rotatably received on said first sleeve means, said second sleeve having a sun gear at one end thereof for rotation therewith, means journalling a brake drum on said first sleeve means, said brake drum being connected to said second sleeve means so as to be rotatable therewith, a fluid actuatable nonrotatable brake disc means positioned around said brake drum and engageable therewith in response to an increase in fluid pressure, output gear means mounted on said first sleeve means for rotation therewith, housing means rotatably carried by said first and second sleeves, said housing means enclosing said sun and output gears, pinion gear means rotatably carried by said housing, said pinion gear means being in meshing engagement with said sun and output gears, pump means carried by said housing, said pump means being coupled to said pinion gear means for rotation therewith, said pump having inlet and outlet passageways, said outlet passageway being connected to outlet means centrally of said housing to direct said fluid toward said sun and output gears.

2. The drive speed control means of claim 1 wherein said first sleeve means has a clutch drum keyed thereto for rotation therewith, said clutch drum being positioned on the opposite side of said housing from said brake drum, fluid actuatable clutch disc means connected to said housing and engageable with said clutch drum and means to inflate said clutch disc thereby to form a directly coupled drive between said housing and output shaft.

3. The drive speed control of claim 1 wherein said second sleeve means is coaxially spaced from said first sleeve means to provide a lubricant passage to said means journalling said clutch drum on said first sleeve means, and sealing means interposed between said clutch drum and said second sleeve means to prevent the escape of lubricant therebetween.

4. The drive speed control of claim 1 wherein said pinion gear means includes first and second pinion gears of diverse diameter integral with a supporting pinion shaft.

5. The drive speed control of claim 1 wherein said pinion gear means includes two pairs of pinion gears rotatably carried by said housing, one pair of pinions being angularly spaced 180° from the other, and spacer means equiangularly spaced from each of said pair of pinion gears, one of said spacers comprising the means to distribute the fluid toward said sun and output gears.

6. The drive speed control of claim 1 wherein said housing means is generally channel-shaped in cross section and includes a generally cylindrical web portion with each of said flanges being removably connected thereto, and means sealing each of said flanges to said web.

7. The drive speed control of claim 1 wherein means is provided on said brake drum to force the surrounding fluid toward the outer peripheral region thereof thereby to cool said drum.

8. The drive speed control of claim 1 wherein said outlet means centrally of said housing comprises a spacer carried by said housing, said spacer being provided with an aperture directed toward the shaft to be driven.

9. In a machine having a rotatable shaft adapted to be driven, a drive speed control comprising first sleeve means connected to said shaft for rotation therewith, second sleeve means received over said first sleeve means and rotatable relative thereto, first and second gear means on said sleeve means, bearing means mounting a brake drum on said first sleeve means, said brake drum being connected to said second sleeve means, nonrotatably supported brake engaging means surrounding said drum, a housing adapted to be rotatably driven surrounding said first and second gear means, means mounting said housing for relative rotation with respect to said first and second sleeve means, pinion gear means carried by said housing in meshing engagement with said first and second gear means and pump means carried by said housing, said pump means being connected to said pinion gear means for rotation therewith to supply lubricant internally of said housing.

10. The drive speed control of claim 9 wherein said second sleeve means is spaced from said first sleeve to allow lubricant to reach said means mounting said brake drum for relative rotation with respect to said first sleeve means.

11. The drive speed control of claim 9 wherein said housing includes an outer cylindrical shell having first and second end plates affixed thereto to form a radially inwardly opening channel, spacer means between said end plates, one of said spacer means having a radially inwardly directed aperture, said aperture opening into said channel and being in communication with an outlet portion of the pump means thereby to direct the lubricant pumped toward said first sleeve means.

12. The drive speed control of claim 11 wherein said pump means is provided with an inlet port which is positioned in one of said end plates adjacent the inner periphery of said cylindrical shell.

13. The drive speed control of claim 10 wherein sealing means is interposed between a hub portion on said brake drum and said second sleeve means to prevent the escape of fluid therebetween.

14. A drive speed control for a machine comprising, in combination, a driven shaft adapted to be driven at differing speeds, a housing member, means for rotating said housing member at a given speed, means for selectively coupling said housing member to said driven shaft at different ratios, said means including clutch means for establishing direct connection between said housing member and said driven shaft, and a planetary transmission, said planetary transmission including at least one planetary gear set mounted for rotation within said housing, said planetary gear set comprising first and second planetary gears connected so as to rotate together, a first sun gear engaged with said first planetary gear, means for selectively holding said sun gear against rotation and for allowing free rotation thereof, a second sun gear engaged with said second planetary gear and fixed for rotation with said driven shaft, an oil pump carried by said housing member and driven in response to rotation of said planetary gear set, means for picking up oil from a periphery of said housing and for directing it to said pump, and means for directing oil radially inwardly from said pump to provide lubrication of said drive speed control.

15. A drive speed control as defined in claim 14 in which said housing includes a flywheel disposed about the radially outer portion of said housing and connected thereto for rotation about the common axis of said flywheel and said housing.

16. A drive speed control as defined in claim 14 in which said oil pump is a positive displacement pump.

17. A drive speed control as defined in claim 16 in which said pump is a sliding vane type pump.

References Cited

UNITED STATES PATENTS

| | | | |
|---|---|---|---|
| 1,470,947 | 10/1923 | Tyler | 74—801 |
| 2,400,964 | 5/1946 | Vincent et al. | 74—781 X |
| 2,495,988 | 1/1950 | Sheppard | 74—801 X |
| 2,591,743 | 4/1952 | Thompson | 74—801 |
| 2,681,126 | 6/1954 | Searls | 74—781 X |
| 2,794,350 | 6/1957 | Hart | 74—802 X |
| 2,936,655 | 5/1960 | Peterson et al. | 74—801 |
| 2,943,517 | 7/1960 | Markley et al. | 74—750 |

DONLEY J. STOCKING, *Primary Examiner.*

T. C. PERRY, *Assistant Examiner.*

U.S. Cl. X.R.

74—781, 802